United States Patent
Benayoun et al.

(10) Patent No.: US 6,341,132 B1
(45) Date of Patent: Jan. 22, 2002

(54) ATM NODE HAVING LOCAL ERROR CORRECTING PROCEDURES

(75) Inventors: Alain Benayoun, Cagnes sur Mer; Jean-Francois Le Pennec, Nice; Patrick Michel, La Gaude; Gilles Toubol, Villeneuve Loubet, all of (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/018,742

(22) Filed: Feb. 4, 1998

(51) Int. Cl.[7] .............................................. H04L 12/56
(52) U.S. Cl. ...................................... 370/397; 370/474
(58) Field of Search ................................. 370/397, 399, 370/395, 473, 474; 714/758, 784, 752, 756, 712

(56) References Cited

U.S. PATENT DOCUMENTS

| | | |
|---|---|---|
| 5,161,156 A | 11/1992 | Baum et al. |
| 5,166,674 A | 11/1992 | Baum et al. |
| 5,539,756 A | 7/1996 | Glaise et al. |
| 5,563,887 A * | 10/1996 | Harasaki ..................... 714/756 |
| 5,699,369 A * | 12/1997 | Guha ......................... 714/774 |
| 5,754,754 A | 5/1998 | Dudley et al. |
| 5,844,897 A * | 12/1998 | Asamizuya ................. 370/395 |
| 6,151,312 A * | 11/2000 | Evans et al. ................ 370/336 |
| 6,157,641 A | 12/2000 | Wilford et al. |
| 6,230,297 B1 * | 5/2001 | Bentall et al. .............. 714/758 |

FOREIGN PATENT DOCUMENTS

FR   2703544 A1 * 10/1994

* cited by examiner

Primary Examiner—Chau Nguyen
Assistant Examiner—Jasper Kwoh
(74) Attorney, Agent, or Firm—Cesari and McKenna, LLP

(57) ABSTRACT

A telecommunication node for an Asynchronous Transfer Mode (ATM) telecommunication network performs Segmentation and Reassembly (SAR) of ATM cells. The SAR particularly provides Virtual Channel Identifier (VCI) and Virtual Path Identifier (VPI) translation and further provides a Direct Memory Access (DMA) for accessing an external storage. When the VCI and VPI identifiers are representative of an Error Code Correcting (ECC) procedure to be carried out in the local mode, the SAR circuit performs a first DMA access which is decoded by an address decoder. Conversely, when no ECC procedure is locally required, the SAR decodes the VCI and VPI and performs a second DMA access which is also decoded by the address decoder. The latter decoding is then used by a Reed-Solomon Coder and Decoder for possibly performing an error correcting procedure on the ATM message formed by the ATM cells being processed.

8 Claims, 12 Drawing Sheets

ATM NODE HAVING LOCAL ERROR CORRECTING PROCEDURES

TECHNICAL FIELD OF THE INVENTION

The invention relates to telecommunications and more particularly to an ATM node, such as a hub, that includes local error correcting procedures.

BACKGROUND ART

The need for improving the integrity of the data being transmitted through large networks has continuously increased, particularly with the development of international business and other activities dealing with sensitive information.

Such concerns obviously applies to the Asynchronous Transfer Mode (A.T.M.) networks which allow transmission of data of different nature via high speed networks.

FIG. 1 illustrates an Asynchronous Transfer Mode (A.T.M.) backbone 1 which topology is comprised, for clarity sake, of hubs 10–50 which are interconnected by means of a set of full duplex opticals links 15, 16, 25, 35 and 45. The ATM networks provides with the possibility to transfer data through the format of cells based on 53 bytes, the cells being concatenated in messages as represented in FIG. 1. Assuming for instance that such a message is received by hub 10 and that this message is transferred through the network via hubs 20, 40 and 50.

Considering now that an error might occur in the transmission path. In this case, the Data Terminating Equipment (DTE) (not represented) which receives the message from the backbone via hub 50 (for instance) detects the occurrence of the error via its own Error Correcting Code (E.C.C.) mechanisms. This detection normally results in the latter discarding the full message being received, what compels the emitting DTE to send back the whole message, that is to say the full number of cells composing the message being lost in the network. It should be noticed that, should the error only affect a single cell, the full message that includes that cell is being lost, what inevitably affects the overall performance and efficiency of the system.

SUMMARY OF THE INVENTION

Therefore a need appears in the ATM technique for a solution which avoid the lost of the full message when one error occurs anywhere in the transmission path.

Additionally, since the ATM networks that exist in the world are composed of a wide variety of different elements, nodes or hubs, it is also required that newly designed hubs still present the compatibility with the already existing equipments (corresponding to huge investments which the customers wish to keep in operation as long as possible).

This problem is solved by the present invention which uses a particular ECC mechanism that is locally distributed at each level of the hubs that compose the ATM network. Therefore, each hub composing the backbone has the possibility of detecting the occurrence of an error, and to correct it. Additionally, the ECC mechanism of the present invention presents the capability of being disconnected, which allows the possibility of handling two different types of messages, comprising or not the internal ECC codes, thus allowing the use of the hub with other existing hubs which do not incorporate the ECC mechanism of the invention.

Basically, the invention takes advantage of the use of the Virtual Channel Identifier (V.C.I.) and Virtual Path Identifier (V.P.I.) for controlling an error correcting mechanism that is provided in the ATM network node.

This is performed by using a Segmentation and Reassembly (S.A.R.) circuit that contains a Direct Memory Access (D.M.A.) circuit for accessing an external storage. The SAR circuit is programmed so that when the VCI/VPI identifiers are representative of an Error Code Correcting procedure to be locally carried out in node, the SAR circuit performs a first DMA access which is decoded by an address decoder and used for controlling a Reed-Solomon coder and decoder. Conversely, when no ECC procedure is required in the node, the SAR decodes the corresponding VCI/VPI and performs a second DMA access which disables the Reed Solomon decoder.

Therefore, according to the requirements of the particular ATM session being established, there appears the capability to perform local ECC correcting procedures. Additionally, since the traditional SAR circuits—ie components off the shelves—may be used for embodying the invention, a simple and low cost hub having ECC capabilities can be designed. At last, the new hub remains fully compatible with the traditional hubs that form part of the ATM backbone network and which do not incorporate the ECC mechanism of the invention.

DESCRIPTION OF THE PREFERRED EMBODIMENT OF THE INVENTION

Figure 1:
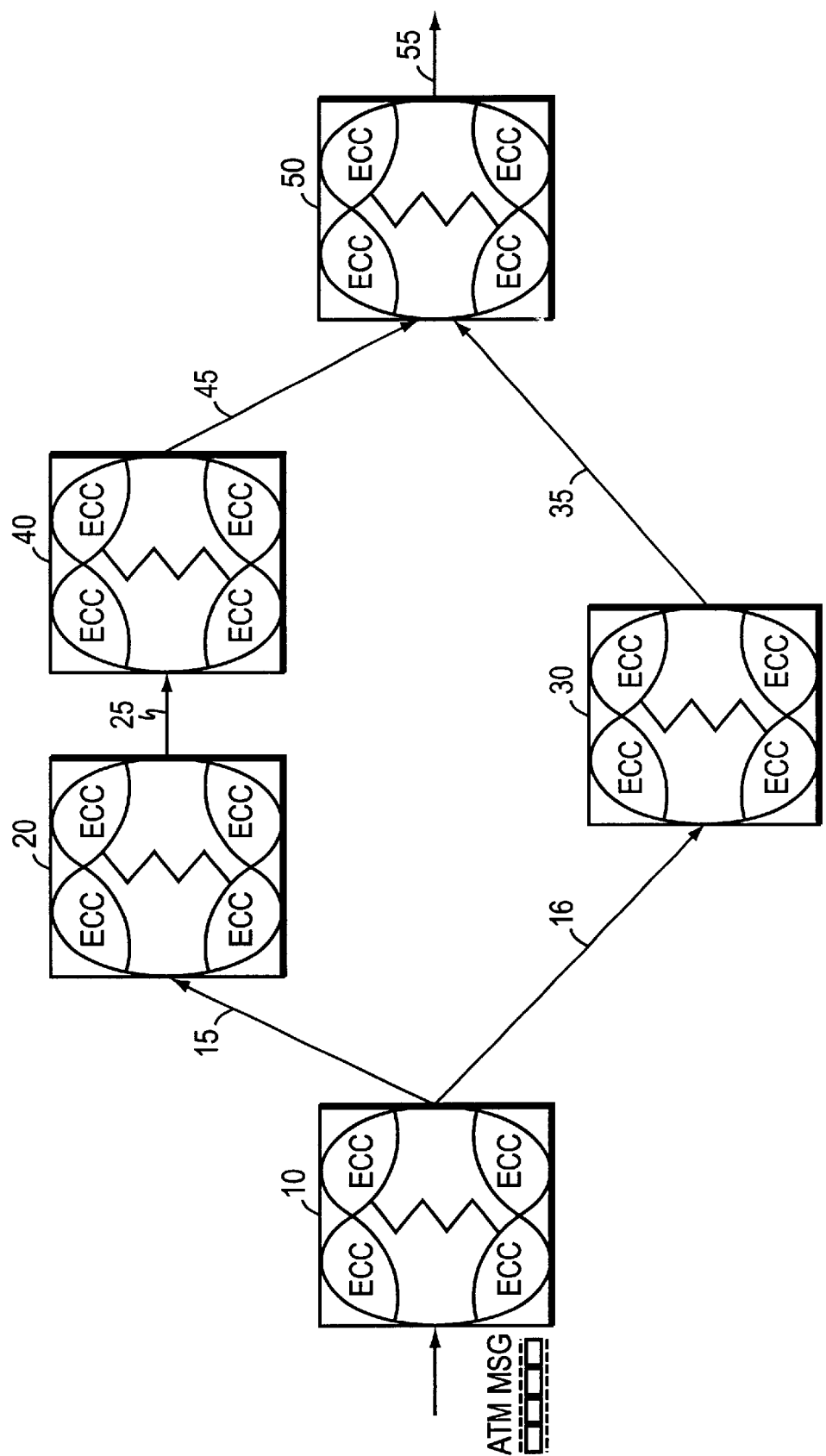
FIG. 1 illustrates an ATM network.
Figure 2:
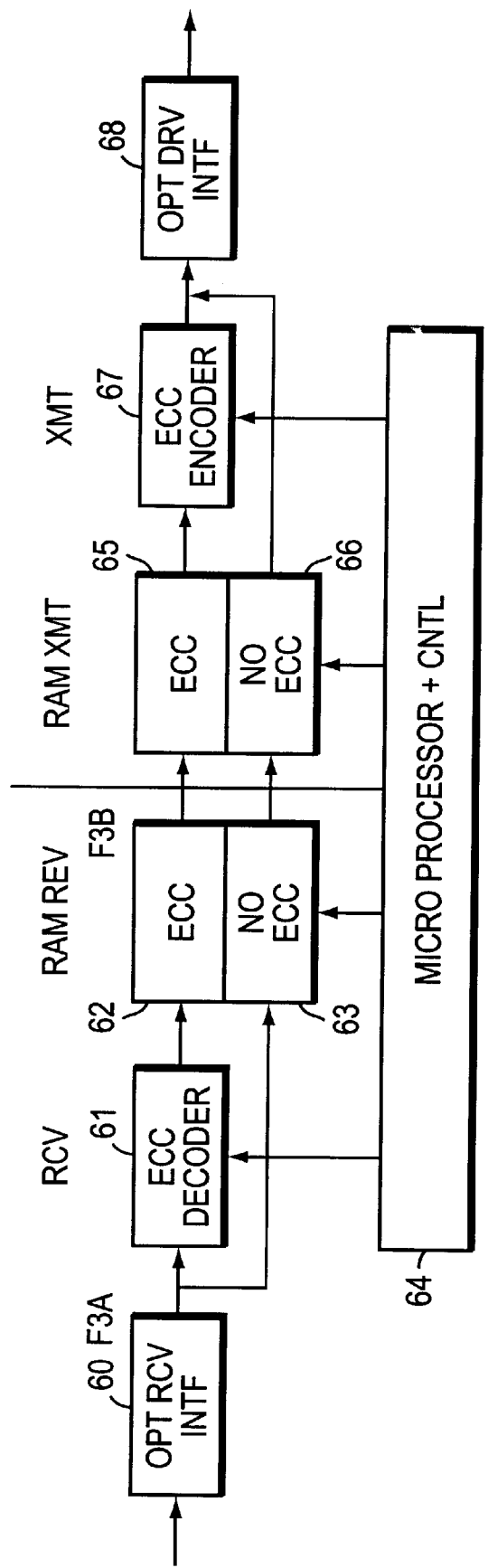
FIG. 2 is a synoptic view of the hub in accordance with the present invention.

With respect to FIG. 2, there is shown a synoptic view of a hub which incorporates the error correcting device in accordance with the present invention. The hub comprises a receive and a transmit part.

The receive part is based on an optical receive interface 60 that primarily performs the electrical conversion of the optical signals that are received from the backbone. Additionally, Interface 60 performs a deserialization of the data flow and transfers it into the memory through appropriate Direct Memory Access (D.M.A.) mechanisms.

It should be noticed that, as will be described later with more details, the ECC syndromes that may exist in the data path are processed by the DMA mechanism in a different way with respect to the ordinary data being conveyed.

In the receive part of the present invention, an ECC decoder 61 is used for performing an error correcting mechanism when the latter is necessary for processing the message being received. In this case, the data being received are stored into a RAM storage 62 which is specially dedicated to this type of data. However, when the message do not involve any ECC mechanism at the hub level, what is the case of all existing equipments, the data flow can be directly loaded into a RAM 63.

Similarly, the transmit part of the present invention uses two distinctive memory locations, a RAM 65 and a RAM 66 which could be obviously located into the same chip, for processing the data corresponding to messages which involves or not an internal ECC mechanism. In the first case, the data that involves an ECC mechanism is loaded into RAM 65 and used by an ECC encoder 67 for generating the appropriate syndrome. However, when the message being processed does not involve an internal ECC mechanism, the data can be directly used by an optical driver interface 68 which converts the ATM cells being into an electrical format into a serialized flow of optical signals.

All the components of the receive and transmit part of the hub are under control of a processor 64.

Figure 3A:
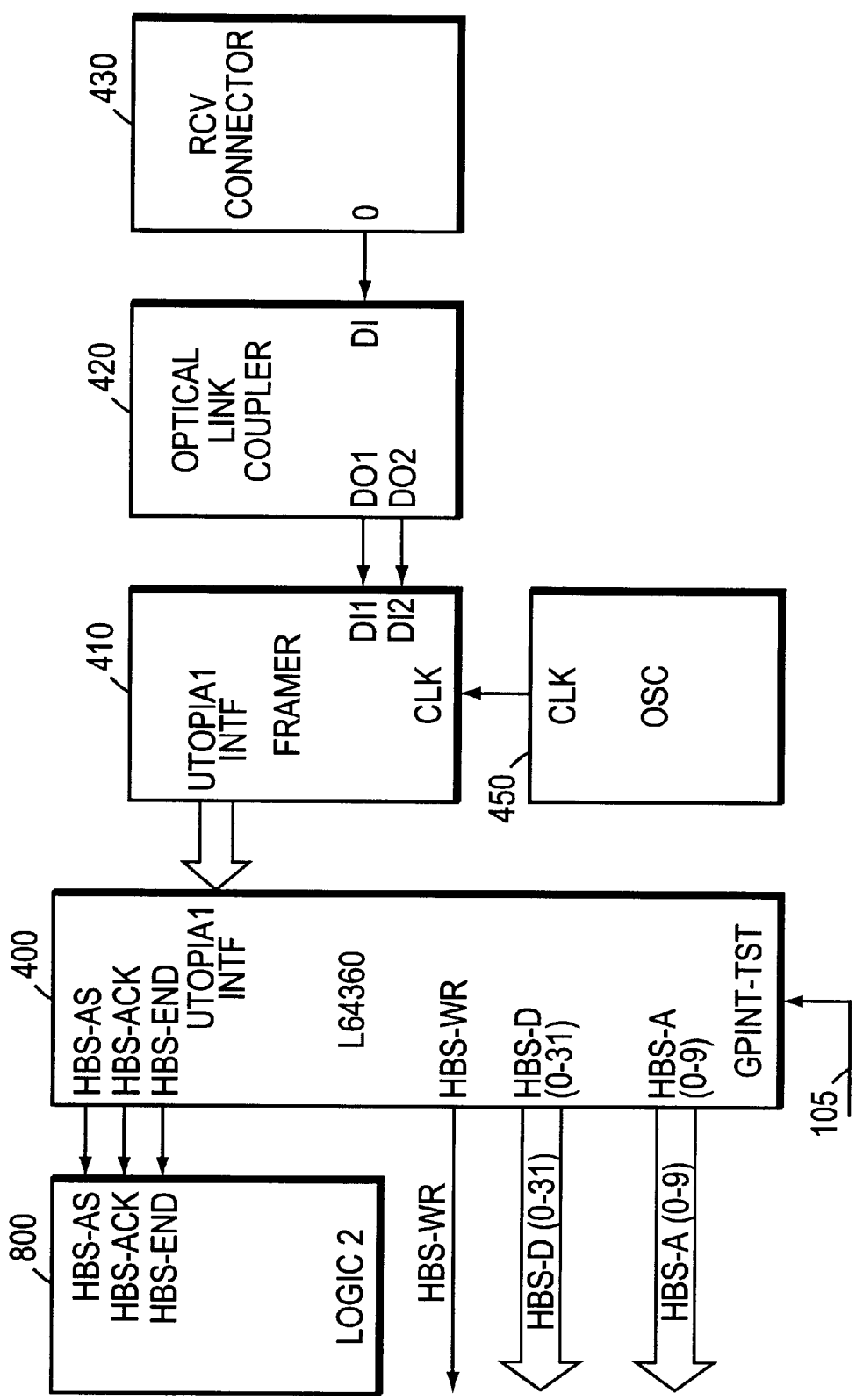
FIGS. 3a, 3b, 3c and 3d illustrate the basic structure and mode of operations of the receive part of the hub that incorporates the present invention.

FIG. 3a illustrates the detail of the structure of the optical receive interface 60 of the present invention. An optical connector 430, for instance of the type Simple Connector (S.C.) is used for receiving the optical signals carried by a (not shown) optical fiber and for transporting the light directly to the appropriate sensitive part of an optical link coupler 420. Coupler 420 converts the light that is received into a set of Pseudo Emetter Coupled Logic electrical signals DO1 and DO2 which can then be transmitted to a framer 410 which, when clocked by an oscillator 450, converts the electrical signals into a set of deserialized bytes which complies with the well-known Universal Test and Operations Physical Interface for ATM (UTOPIA1) standard. The UTOPIA1 interface of module 410 provides with 8-bit bytes to the corresponding interface of an SAR circuit 400 which is used for buffering the incoming data into an internal buffer. As soon as the buffer is full, a DMA transfer is initiated by module 400 under control of logic module 800 so that the data being buffered can be transferred into the RAM storage of the receive part.

It should be noticed that modules 400, 410 and 420 can be embodied by means of modules that are commonly marketed by the telecommunication products suppliers. For instance, optical coupler 420 can be based on a module known under the part number SDX1155B and marketed by HEWLETT PACKARD Company. Framer 410 can use a chip marketed by NEC under the reference PD98402 and module 400 can be for instance a chip referenced L64360 which is marketed by L.S.I. Logic Corp and known under the label ATMizer (Trademark).

However, it should be noticed that any equivalent chips or modules could be used for emboding the optical receiving interface of the invention. With respect to FIG. 3b there is shown the different elements which allows, under control of a processor, the processing of the data flow containing or not a syndrome and the appropriate processing prior to the storage into the memory of the hub.

A Receive Dual Port RAM 170 has its right address bus (AR 0–9) which is connected to the corresponding address bus HBS-A (0 to 9) of SAR module 400. Similarly the right data bus (DR 0 to 31) of RAM 170 is connected to the corresponding data bus HBS-D (0 to 31) of SAR module 400. The Write control lead of ram 170 receives via an inverter 180 an HBS-WR control signal which is generated by SAR module 400.

Receive Dual Port RAM 170 has its left address bus (AL 0–9) which is connected to a corresponding address bus of a control logic odule 190 (LOGIC1), as well as the address bus of a buffer module 160 (buffer1 in the figure). Similarly the left data bus HBS-L (0 to 07) of RAM 170 is connected to the corresponding data bus of buffer 160 (buffer1) and to the data bus of a REED SOLOMON decoder module 200 (RSD). The latter module is well-known to the skilled man and is used for checking the integrity of the data that is received in the data flow. A read signal that is issued either from control module 190 or buffer module 160 is transmitted to the dual port RAM 170 for controlling the read operation of the latter. Logic module 190 receives an Enable (EN) control signal through the I/O3 lead of microcontroller 100. Reed Solomon decoder 200 is controlled by logic module 190 through an DIMS control signal and, conversely, the former transmits an acknowledgment signal DOMS to the latter. Additionally, RSD module 200 receives a Write control signal (WR) on lead 109 from microcontroller 100. Logic module 190 provides RSD module 200 with the appropriate clock signal and the latter has its address (A0 to A3) and data (D0 to D7) busses 102 and 101 which are respectively connected to the corresponding address and data busses of microcontroller 100. The Address and the data busses of microcontroller are also connected to the corresponding address and data bus of buffer module 160. An interrupt signal DFAIL can be generated by RSD module 200 and transmitted to a INT1 interrupt lead of microcontroller 100.

At last, RSD module 200 has data out bus (DO 0 to DO7) which is connected to a DI bus of a Receive FIFO DUAL PORT 210, which output port (DO0 to DO31) is connected to the data bus 101 of microcontroller 100.

The Write (WR) and Chip Select Write (CSR) leads 719 of RAM 210 receive a control signal (WRFIFO) from Logic module 190. On the other hand, the Read (RD) and Chip Select Left (CSL) leads of RAM 210 which receives a control signal which is generated by an OR gate 110 which first input 103 is connected to receive the READ signal of microcontroller 100, while the second input of the OR gate 110 receives the inverted I/O2 control signal of the latter microcontroller. An I/O6 control signal is generated by controller 100 and transmitted to FIFO module 210.

Microcontroller 100 also generates a Chip Select (CS1) control signal which is transmitted to the CS input lead of RSD module 200, and Input/output (I/O2) control signal which is transmitted to the Enable (EN) input lead of buffer 160. A Read (RD) control signal generated by microcontroller 100 is transmitted to an Read Input (RDI) lead of buffer 160.

An address decoder module 150 has an input bus IN0-9 which is connected to receive the HBS-A (0 to 9) address that is generated by SAR module 400, and receives to its EN input lead the HBS-WR control signal that is also generated by SAR module or ATMizer 400. Address decoder 150 is used to decode the occurrence of two distinctive ranges of addresses on the address bus HBS-A and as, correspondingly, two output leads Z1 and Z2 which are respectively connected to the S input lead of a first and second set/reset latch 130 and 140. Latch 130 has its Reset lead which receives the output of an OR gate 120, the first input of which receives a DFAIL signal 201 while the second input of which receives an I/O1 control signal from microcontroller 100. Latch 130 has its Q output lead which is connected to a TIMER2 input lead of microcontroller 100 and also to a GOECC input lead 131 of Control module (LOGIC1) 190.

Latch 140 has its Reset lead which receives the I/O5 control signal from microcontroller 100, while the Q output lead is transmitted to the TIMER1 input lead of the latter microcontroller.

The operations of the receive part will now be described with further details.

At the power-on reset, microcontroller 100 starts an initialization procedure which particularly results in module 400 and the RSD module 200 be programmed as follows. First of all, the internal Direct Access Memory (D.M.A.) parameters of the SAR module are programmed so that the structure of the message which will be handled be reduced to a fixed number of cells. This will allow the SAR Module 400 to arrange its internal RAM organization in order to process the different ATM cells which it will receive from the network. In the preferred embodiment of the invention, the buffer is sized to a number of four cells which appears to be particularly adapted to the operations of the Reed Solomon Encoder 200. However, it should be noticed that, should an other specialized module be used for performing the ECC procedure controlled by the SAR module 400 in accordance with the present invention, the number of cells which will be used in the buffer of the ATMizer will need to be adapted. For instance, should a classical Hamming encoder/decoder be used, the number of cells which will have to be loaded into the internal buffer of module 400 will have to be adapted.

During the initialization procedure, the RSD module is programmed for processing 212 bytes which corresponds to four payloads of ATM cells. The programming of the RSD module 200 is under control of Controller 100 by means of appropriate Chip Select CS1 and write control signals.

Additionally, module 400 is programmed during the initialization period so that its internal "address direction tables" be loaded for all the VPI/VC being used.

As the data is received from the network by optical link coupler 420 at the rhythm of the light impulsions that are provided by the receive connector 430, the latter are converted into their analog representations on the two analog electrical wires DO1 and DO2. The framer 410 thus receives a serial data flow at its two input leads DI1 and DI2, and performs a deserialization of the serial data stream into a corresponding flow of words of 8 bits which complies, in the preferred embodiment of the invention, to the UTOPIA1 standard. The latter conversion is performed at the rhythm of the clock which is provided by oscillator 450.

SAR Module 400 receives the flow of words at its UTOPIA1 interface. First of all, it stores the succession of words in its internal memory space which is generally called the Virtual Channel RAM (V.C.R.). Then, for each cell and in accordance with the particular value that is carried in the VPI/VC field associated to the cell, generates an address on address bus HBS-A that will cause the controllable ECC system of the invention to execute or not the error correcting procedures.

This is achieved as follows: module 400 first waits the generation of an I/O9 control signal generated by microcontroller 100 on lead 105 indicating that the latter is ready for further processing. Additionally, module 400 waits for the reception of the number of ATM cells which are needed to construct an ATM message. This number is fixed to four when no ECC procedure is required at the hub level and is fixed to five when such an ECC procedure is needed since the fifth ATM cell will be used for carrying the ECC syndrome. After having received the required number of cells, four or five in accordance with the VP/VC, the module 400 starts the process of performing a DMA transfer of the payload of the ATM cells. To achieve this, module 400 first loads RAM 170 with data (32-bit words) indicating the type and nature of the DMA transfer which will be performed at the next step. This data can then be read by the microcontroller 100 through 160 by means of the conventional address and data bus 102 and 101. Such a data transfer in generally known in the art under the expression "mail-box". In particular, the microcontroller can be made aware of the value of the VPI/VC that will be associated to the future DMA transfer in RAM 170. Then, SAR module 400 carries out the successive transfer of the contents of the payload of the four or five ATM cells via the data (HBS-D) and address (HBS-A). busses. The effective write is performed by means of the write control signal that is generated by the SAR module 400 and transmitted to RAM 170 via inverter 180. Thus, the ATM message formed by the four or five payloads is being loaded into the RAM storage 170 at the address that is specified by the SAR module 400 in accordance with the filtering process performed with the internal tables loaded in the module.

Paralelly, the address that is generated by the SAR module 400 during the successive transfer of the four or five payloads (in accordance with the case) is decoded by a specific address decoder 150 which will provide with two distinctive Z1 and Z2 control signals in accordance with the appropriate ECC processing that is wished for the ATM message (the VPI/VC) that is considered. More particularly, should the four or five payloads be processed correspond to a normal ATM message for which no error correcting procedure is required, the SAR module produces a first range of addresses that causes decoder 150 to produce a Z2 control signal.

The Z2 control signal causes latch circuit 140 to generate a high level at its Q output, what high level is transmitted to the TIMER1 input lead of microcontroller 100. This causes an internal timing process which raise an internal interrupt which will be generated after a period which is fixed at a value being slightly superior than the transfer of four payloads of ATM cells. When that internal interrupt is raised, microcontroller is made aware of the loading of four payloads that have been received.

It first generates a control signal at its I/O5 output lead, what results in the reset of latch 140. Since the four cells which are loaded into the RAM storage 140, microcontroller 100 can then read RAM storage 140 via buffer 160. To achieve this, controller 100 generates a I/O2 control signal, what firstly enables the buffer 160 and, secondly, causes the blocking of the read and the chip select left (C.S.L) of the receive dual port RAM 210 via OR gate 110. The enabling of the buffer 160 causes the addresses being generated by controller 100 to be transferred to the address bus 191 and, conversely, the data that are extracted from RAM 170 to be transferred to the data bus 101 of microcontroller 100. The microcontroller 100 has then an access to the data of the four payloads loaded into RAM 170 by generating the appropriate address on address bus 191 which will then deliver the data which was received. The microcontroller 100 then stores the data extracted from the RAM 170 into its internal RAM storage for further processing. That further processing is not part of the present invention and will not be further discussed. It should be noticed that such further process may include the traditional operations that are carried out in a hub, for instance the cell switching, the Local Area Network (L.A.N) emulation, routing, bridging etc . . .

Conversely, if the five payloads corresponds to ATM cells constituting a message for which an error correcting procedure is required—this is the case for banking application for instance or other high safety transmission, the SAR module 400 produces a second range of addresses that causes decoder 150 to produce a Z1 control signal. This causes the setting of Set-Reset latch 130, which Q output is connected to a second TIMER2 input lead of microcontroller 100. This initiates a second timing process which causes the generation of an internal interrupt after a period which is fixed at a value being slightly superior than the transfer of five payloads since the fifth one has to carry the ECC syndrome.

When that internal interrupt is raised, microcontroller is made aware of the loading of the five payloads. The Q output lead of latch 130 is also connected to a GO-ECC input lead of a control logic circuit 190, what allows the starting of a state machine at the switching of the level of Q latch 130.

Since the I/O2 output lead of microcontroller carries a low level, the buffer 160 is disabled. Therefore, the two address and data busses 191 and 170 are electrically isolated from the address and data busses of microcontroller 100 as soon as the first byte of the five ATM cell is being loaded into RAM 170.

The GO-ECC control signal that is generated by latch 130 causes the control logic 190 to produce Decoder Input Message Start (D.I.M.S.) control signal for controlling the RSD module 200, and to generate a succession of addresses on bus 191, what causes the extraction of the different bytes forming the payloads that have been loaded by SAR module 400. The data included in the five payloads can then be made available to the Reed Solomon Decoder 200 which transfers the latter to the Receive FIFO Dual Port RAM 210. When the last byte forming the four ATM payloads is received, the RSD module completes the ECC code and checks the result with the syndrome which is carried by the fifth payload. If the two values appear to be identical, or if the RSD module 190 managed to correct an slight error that might have occurred, the processing of the RSD module completes. However, in the case of an uncorrectable error, the RSD module 200 generates a DFAIL signal that is transmitted to controller 100 via its INT1 interrupt lead 201.

The microcontroller is then made aware of the occurrence of an uncorrectable error. It raises the I/O6 output lead which is connected to the RST input lead of RAM 210, what results in the reset of the internal pointer of the Receive Fifo Dual Port 210. The recovery will be made by the upper layers of the telecommunication protocols.

In the case where no uncorrectable error did occur, the microcontroller 100 has then an access to the data of the four payloads loaded into RAM 210. This is achieved by means of successive Read signals, what entails the successive extraction of the data which were loaded into FIFO Dual port RAM 210. The controller can then, as previously, process the different payloads in accordance with the VPI/VC being associated and the application being considered, e.g. cell switching, LAN emulation etc . . .

Figure 3B:
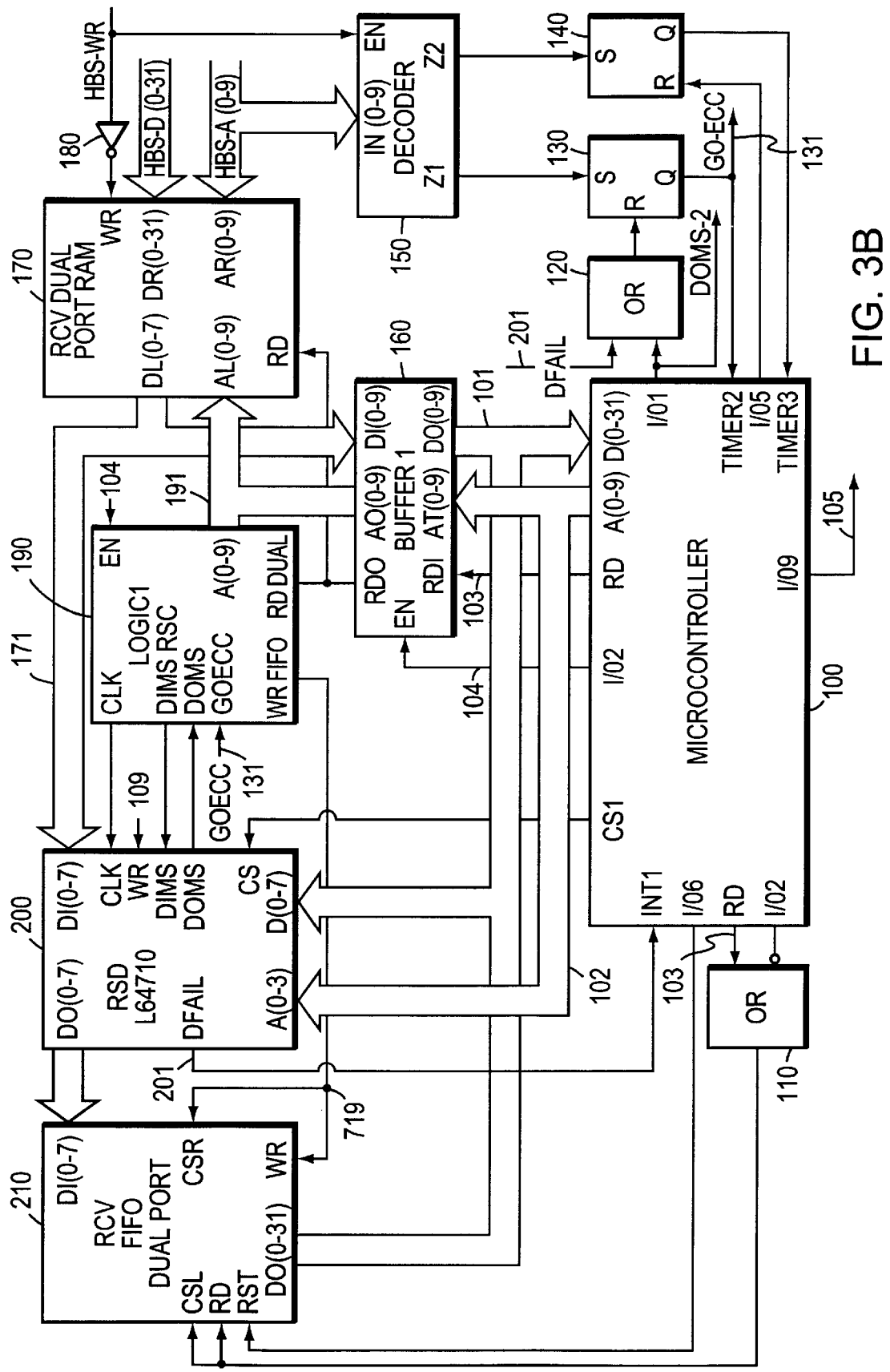
Figure 3C:
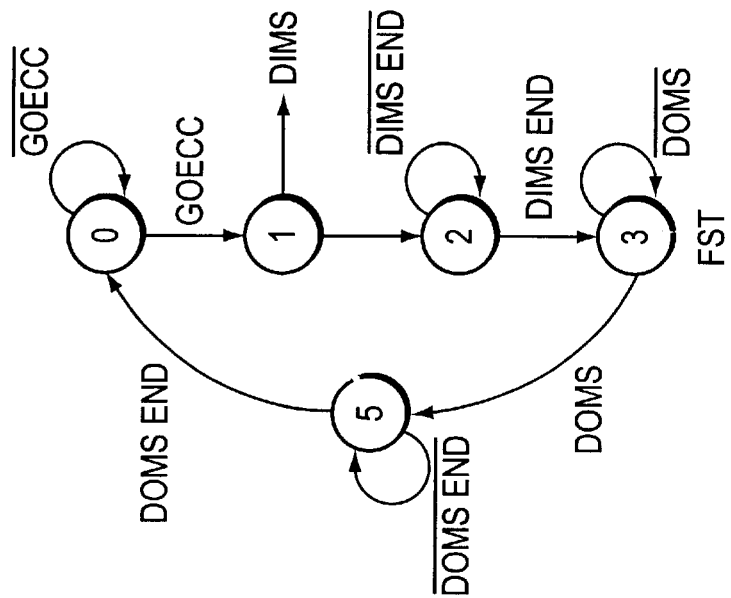
Figure 3D:
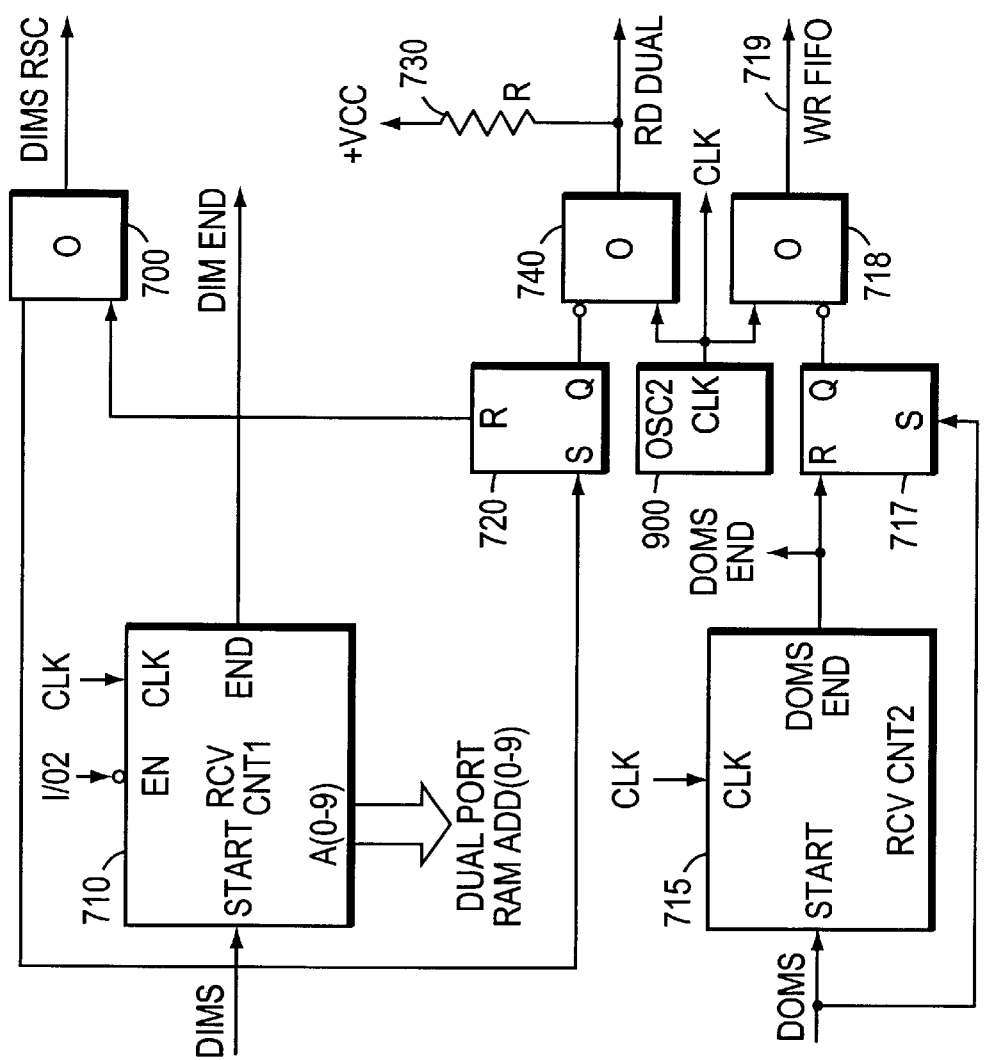

With respect to FIG. 3c and FIG. 3d, there is now described the structure of the control logic module 190. The latter uses a state machine which is particularly shown in FIG. 3c. State 0 is the idle state. On the occurrence of the GO-ECC signal generated by latch 130, the state machine switches to state 1 which decoding results in the generation of DIMS control signal. State 2 corresponds to the waiting of a DIMSend signal which is generated at the completion of the counting process of a counter 710 which will be described in reference with FIG. 3d. On the occurrence of DIMSend issued by the latter counter 710, the state machine switches to state 3 where it waits for the occurrence of a DOMS signal produced by the RSD module 200. Then, the state machine switches to state 4 where it waits for the occurrence of the DOMSend being generated by a second counter 715 located into control logic module 190. Then, the process returns to the idle state 0.

With respect to FIG. 3d, there is now shown a basic structure of the Logic control circuit 190. The circuit is based on a Receive Counter RCVCNT1 module 710 for generating a succession of addresses, and having a start input lead receiving the DIMS control signal generated by the state machine described above. The Enable and Clock input lead are respectively connected to receive a control signal from the I/O2 output lead of controller 100 and the clock signal generated by an oscillator circuit 900 (OSC2). When the counting process performed by counter 710 completes, an DIMSEnd signal is generated which is used for the state machine described above, and which is also transmitted to a first input lead of an OR gate 700 and to a R input lead of a latch 720. The DIMS control signal is also transmitted to the second input lead of OR gate 700 and to the Set input lead of latch 720. Therefore, OR gate 700 is able to produce the DIMS RSC control signal that is used for RSD module 200 (received at the DIMS input lead), and the latch 720 generates at its Q output lead a signal which is transmitted to an inverted input lead of an OR gate 740 receiving the clock signal at its second input. Or gate 740 is an open-collector gate which has its output being pulled up to the positive voltage by means of resistor 730 and carrying the Read Dual control signal which is required at the Read input lead of RAM 170.

Similarly, control logic module 190 includes a second counter RCVCNT2 module 715 has its start input lead receiving the DOMS control signal, and performs a counting at the rhythm of the clock received at its clock input lead. As soon as the latter counter achieves the counting of 151 cycles after the occurrence of the DIMS signal, counter 715 generates the DOMSend control signal which is transmitted to the R input lead of a latch 717 and is processed by the state machine which was described above. Latch 717 has a Q output lead which is connected to a first input lead (inverted) of an OR gate 718, which second input lead receives the clock signal generated by oscillator 900. The output of gate 718 generates the WRFIFO control signal 719 which is transmitted to the Chip Select Right (C.S.R.) and WRITE input lead of RAM 210.

Figure 4A:
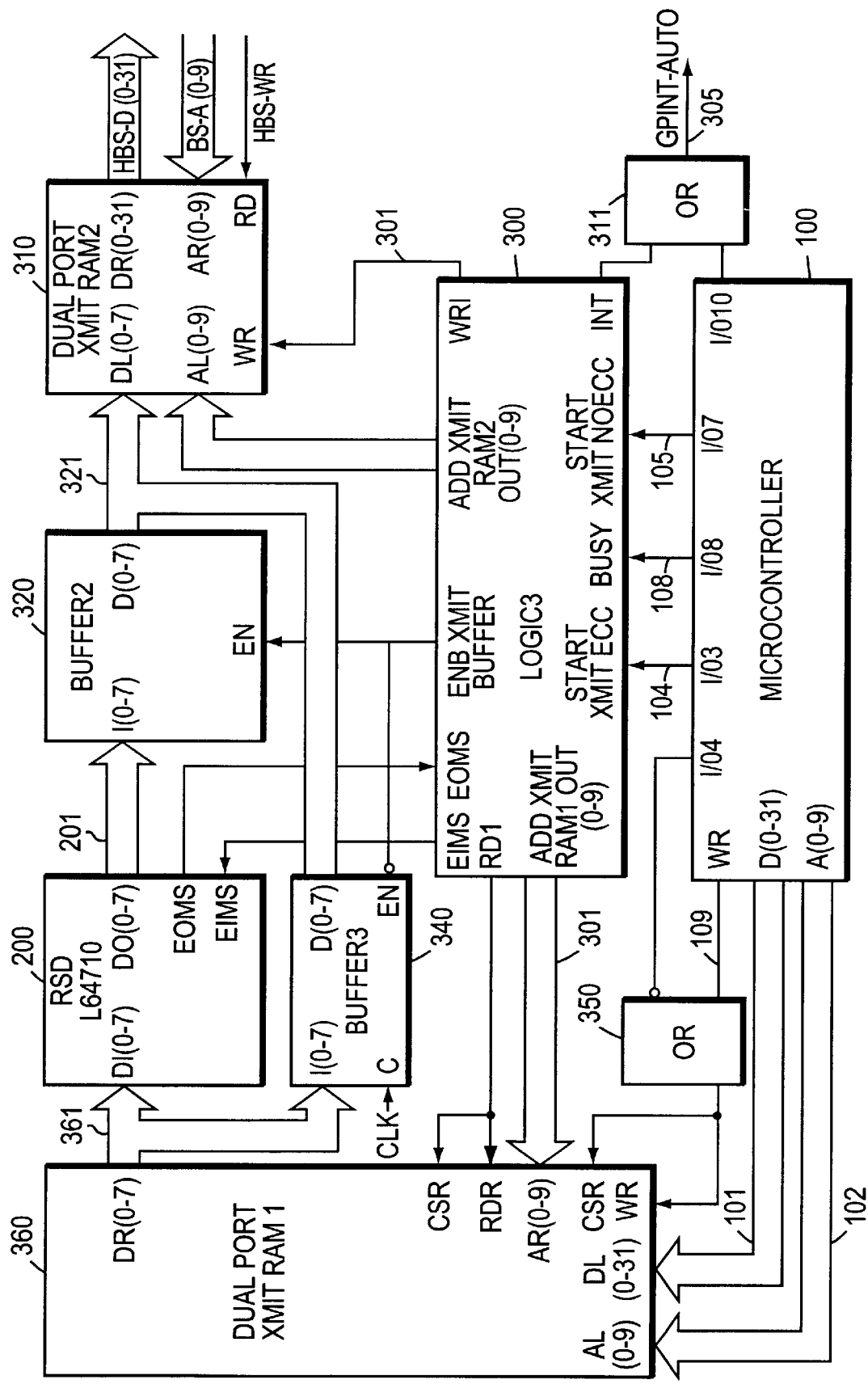
FIGS. 4a and 4b illustrate the basic structure of the transmit part of the present invention.
Figure 4B:
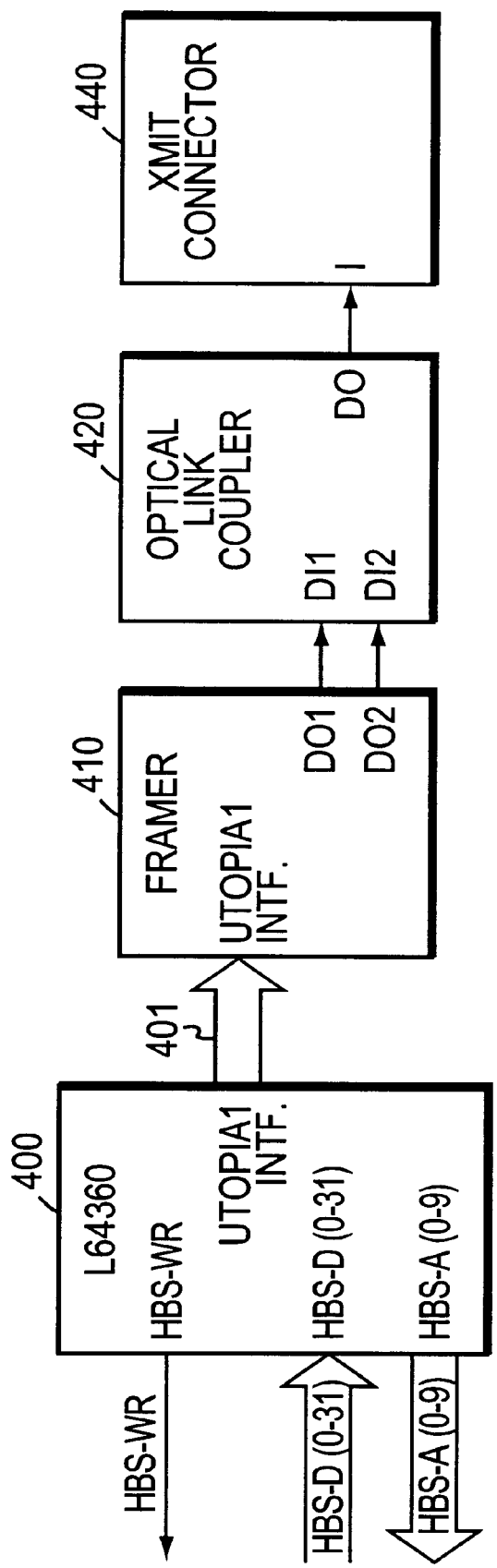

With respect to FIG. 4a, there is shown the basic structure of the transmit part of the circuit in accordance with the present invention. The circuit is based on the use of a first Dual Port RAM (Xmit RAM1) storage 360 and a second Dual Port RAM (Xmit RAM2) storage 310 and a Reed Solomon Coder 200. It should be noticed that the Reed Solomon Decoder is embodied in the same chip than the Reed Solomon decoder that was used in the receive part of the present invention. These components are controlled by means of microcontroller 100 and a logic3 module 300 as will be described with more details hereinafter.

More particularly, Microcontroller 100 has its data bus (0–31) and address bus (0–9) being connected to the corresponding left side busses of RAM 360. The Write and Chip Select lead of RAM 360 receives the output signal of an OR gate 350, the latter having a first input receiving the (inverted) output signal of I/O4 lead of microcontroller 100 and a second input lead receiving the Write control signal generated by the latter microcontroller. The right data bus (0–7) 361 of RAM 360 is connected to the data In bus (DI)

of RSD module 200 as well as to the data bus of a clocked registered buffer 340. RSD module 200 has its Data out bus (DO) 201 which is connected to a corresponding data in bus of a buffer 320 (buffer2) having its data out bus being connected to the data left bus (DL) of Dual Port Ram 310, and also to the data out bus of buffer 340 (buffer3).

Dual Port RAM 310 has its right data out bus (DR, 0–31) which is connected to the HBS-D data bus of SAR module 400. RAM 310 has its right address bus (AR, 0–9) which is connected to the HBS-A ofSAR module 400. The latter SAR module generates a HBS-WR control signal which is transmitted to the Read input lead of Dual Port RAM 310 and, conversely, receives a GPint-Auto interrupt signal on lead 305 which is generated by an OR gate 311, the first input of which receiving an I/O10 control signal from controller 100 and the second input of which receiving an INT interrupt control signal from LOGIC3 control module 300. The output bus ofSAR module 400 provides with the UTOPIA1 interface with framer circuit 410 which, generates the two PECL analog signals DO1 and DO2 to optical link coupler 420. The optical signal is then transmitted to the network via a Xmit optical connector 440.

The different elements of the transmit part operate together with the assistance of the specific Logic3 control circuit 300 which generates the addresses that are needed for RAM 360 and 310. Particularly, Logic control module 300 has an ADD XMIT RAM1 output bus which is connected to the corresponding Right Address bus 301 of RAM 360. Similarly, an ADD XMIT RAM2 output bus of module 300 is connected to the Left Address bus of Dual Port RAM 310. Additionally, control module 300 generates a WRITE/READ control signal 1301 to RAM 310, a Enable (ENB XMIT Buf) control signal 571 that is transmitted to the (inverted) enable lead of buffer 340 and to the Enable input lead of buffer 320, a EIMS control signal that is transmitted to the EIMS input lead of RSD module 200, and a Busy control signal that is transmitted to I/O8 lead of microcontroller 100. Conversely, Logic control module 300 receives a EOMS control signal from RSD module 200, a Xmit_ No_ECC control signal 105 from I/O7 lead of microcontroller 100.

The transmit part of the hub in accordance of the present invention operates as follows.

During the above mentioned initialization period, the RSD module 200 and the SAR module 400 are programmed in a similar fashion than for the receive part. Let us consider that the microcontroller 100 wish to transmit data through the telecommunication network without involving any error correcting procedure. In this situation, microcontroller 100 first loads RAM 360 with the four payloads which correspond to the four ATM cells which will be transmitted to the network. This is achieved, parallely with the generation of the appropriate data and addresses to busses 101 and 102, by issuing a control signal through I/O4 output lead, simultaneously with a Write control signal, what results in the activation of both WR and CSL input lead of RAM 360.

Then, microcontroller gets an access to the so-called mail-box in AM 170 of FIG. 3B in order to inform the SAR module 200 of the different parameters belonging to the future transmission of the four ATM cells. This access is achieved similarly than what was described for the receive part.

Then, microcontroller raises an interrupt signal through I/O10 lead which results in the transmission of an GPINT-Auto control signal to SAR module 200.

Then, microcontroller 100 checks whether the Busy signal on lead 108 is active, in which case it waits until it becomes inactive. As soon as the Busy signal is inactive, microcontroller 100 generates an control signal through I/07 lead 105 to the Start_Xmit_NoECC lead 105.

Control logic circuit 300 receiving the Start_Xmit_ NoECC control signal from microcontroller, produces a Enable Xmit Buffer control signal which enables buffer 340 and disables buffer 320. Parallely, control circuit 300 generates the appropriate addresses (on bus 301) and control signals—including the Chip select Right and Read Right control signals—to RAM 360.

Therefore the data of the four payloads are successively transferred from RAM 360 to RAM 310 via buffer 340, the latter storing the different data since control logic circuit 300 issues the appropriate addresses on address left bus and WR control signal needed by RAM 310.

When the transfer of the data completes, control logic circuit 300 issues an interrupt signal which is transmitted to OR gate 311, what results in the transfer of the GPINT-AUto to SAR module 400.

On the other side, the SAR module 200 which received the interrupt from controller 100 performs a DMA access to the RAM 170 in order to read the contents of the mail-box referring to the transmit part.

Module 400 is then made aware that a set of data corresponding to four payloads is available into the RAM storage 310. The latter then generates the appropriate addresses on bus HBS-A and HBS-WR control signal (being transmitted to the Read input of RAM 310, and to Write input of RAM 170 of FIG. 3b via inverter 180) so that it can successively stores the four payloads into its internal Virtual Channel RAM storage. The SAR module can then performs the assembling of the ATM cells by associating the payloads with the appropriate header in accordance with the ATM format. Once, formatted, the ATM cells are transmitted through the UTOPIA1 interface to frame 410 for a further transfer to the network via the optical link coupler 420.

Should the microcontroller 100 wishes to transmit ATM cells with the use of ECC procedures, the operations will be as follows:

Firstly, microcontroller 100 loads RAM 360 with the four payloads which correspond to the four ATM cells which will be transmitted to the network. This is achieved as above by involving the I/O4 control lead.

Then, microcontroller gets an access to the so-called mail-box in RAM 170 of FIG. 3B in order to inform the SAR module 200 of the different parameters belonging to the future transmission of the four ATM cells. This access is achieved similarly than what was described for the receive part.

Then, microcontroller raises an interrupt signal through I/O10 lead which results in the transmission of an GPINT-Auto control signal to SAR module 200.

Then, microcontroller 100 checks whether the Busy signal on lead 108 is active, in which case it waits until it becomes inactive. As soon as the Busy signal is inactive, microcontroller 100 generates a control signal through I/O3 to the Start_Xmit_ECC lead 104.

Control logic circuit 300 receiving the Start_Xmit_ECC control signal from microcontroller, disables buffer 340 and enables buffer 320. Parallely, control circuit 300 generates the appropriate addresses (on bus 301) and control signals— including the Chip select Right and Read Right control signals—to RAM 360.

Therefore the data of the four payloads are successively transferred from RAM 360 to the Read Solomon Encoder module 200. Parallely, control logic 300 generates a EIMS control signal to RSD module 200 for starting the ECC process. The data which are transferred to the module 200 are passed through the latter module and presented at the input bus of buffer 320 which was previously enabled. The data being transferred is made available at the left data input bus of RAM storage 310 which receives the appropriate addresses from control logic module 300 on its left address bus (ADD XMIT RAM2 OUT). Since control module 300 issues the WRITE control signal, the four payloads can then be loaded into RAM 310.

When the ECC process completes, RSD module 200 generates a EOMS control signal which is transmitted to control module 300 which is then made aware that a set of five payloads (the fifth corresponding to the syndrome which was computed by the RSD module 200) is available into the RAM 310. Then, control logic circuit 300 issues an interrupt signal which is transmitted to OR gate 311,what results in the transfer of the GPINT-AUto to SAR module 400.

On the other side, the SAR module 200 which received the interrupt from controller 100 performs a DMA access to the RAM 170 in order to read the contents of the mail-box referring to the transmit part module 400 is then made aware that a set of data corresponding to five payloads is available into the RAM storage 310. The latter then generates the appropriate addresses on bus HBS-A and HBS-WR control signal so that it can successively store the five payloads into its internal Virtual Channel RAM storage. The SAR module can then performs the assembling of the five ATM cells by associating the payloads with the appropriate header in accordance with the ATM format. Once, formatted, the ATM cells are transmitted through the UTOPIA1 interface to frame 410 for a further transfer to the network via the optical link coupler 420.

Figure 5:
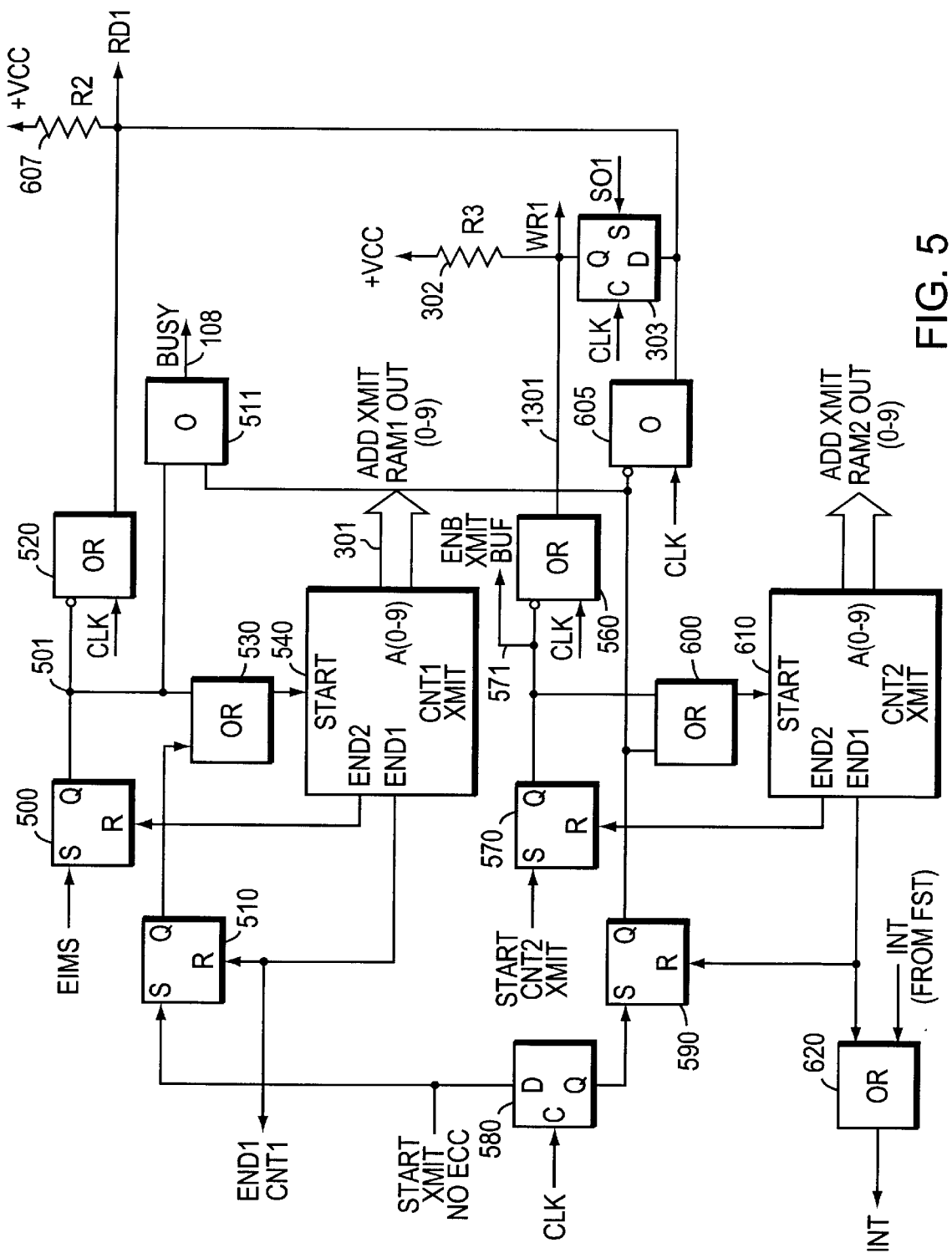
FIG. 5 represents the structure of logic control module 300.

With respect to FIG. 5 there is now described the basic structure of logic control module 300. Module 300 is based on a set of two counters (CNT1_Xmit) 540 and (CNT2_Xmit) 610 which are used for respectively generating the addresses used for addressing the RAM storage 360 and 310. The START_Xmit_No_ECC signal is transmitted to a set input of a Set input lead of a Latch 510 and to the D-input lead of a latch 580, the output of which is transmitted to a set input lead of a set-reset latch 590. The latter has its output which is connected to an inverted first input lead of an OR gate 605, to a first input of an OR gate 600 and to a first input of an OR gate 511. Set-Reset latch 510 has its Q output lead which is connected to a first input of an OR gate 530, the output of which carrying the START signal which is needed for counter module 540.

An EIMS control signal is generated by a state machine (hereinafter described with respect to FIG. 6) and transmitted to a Set input lead of a Set/reset latch 500, which Q output is connected to a first (inverted) input lead 501 of an OR gate 520, to the second input lead of OR gate 530, and to the second input lead of OR gate 511 which generates the Busy control signal 108 which is used by microcontroller to determine whether control module 300 is available or not. Counter module 540 generates a END1 and END2 control signal which are respectively transmitted to the reset of lead of latches 510 and 500. The 10 bits forming the address needed by RAM storage 360 is available on the address bus 301 of counter module 540.

An START_CNT2_Xmit control signal is generated by a state machine (hereinafter described with respect to FIG. 6) and transmitted to a Set input lead of a Set/reset latch 570, which Q output is connected to a first (inverted) input lead 571 of an OR gate 560, to the second input lead of OR gate 600, the output of which generates the START signal needed for module 610. The control signal on lead 571 is also used to produce the ENB_Xmit_Buff needed by buffer 340. Counter module 610 generates a END1 and END2 control signal which are respectively transmitted to the reset of lead of latches 590 and 570. The 10 bits forming the address needed by RAM storage 310 is available on the address bus of counter module 610. The END1 control signal generated by counter 610 is also transmitted to a first input of an OR gate 620, which second input receives the INT control signal generated by the state machine which will be described with respect to FIG. 6. The output of OR gate 620 carries the INT control signal which is transmitted to a second input lead of OR gate 311, and then to microcontroller 100.

The output of OR gate 560 produces a WR1 signal on a lead 1301 which is clamped to the positive voltage VCIC via a R3 resistor 302 and also connected to the open-collector output lead of a latch 303. The latter has its Set input lead which receives on lead 501 the control signal generated at the Q output lead of latch 500. The D input lead of latch 303 receives the RD1 signal which is produced by the two open-collector outputs of OR gates 605 and 520, both clamped to the positive voltage via a R2 resistance 607. The desired clock signal is transmitted to the second input lead of OR 520, to the second input of OR gate 560, to the second input lead of OR gate 605 and to the two clock input leads of latches 580 and 303.

The control module 300 operates as follows: Assuming that the microcontroller generates an START_Xmit_No_ECC control sign al—indicating that no ECC is required for the transmission of the four payloads to the networks 13 latches 580, 590 and 510 are set, what results in the starting of counters 610 and 540. Parallely, the setting of latch 590 entails the generation of the WR1 and RD control signal via OR gate 605 and latch 303.

Therefore it appears that control machine 300 generates the appropriate addresses and control signals which allows the transfer of four payloads from the first RAM storage 360 to the second RAM storage 310.

When the last byte of the four payloads has been transferred, the corresponding address is decoded by counter 540, what results in the generation of an END1 control signal which resets the Set-reset latch 510. This renders inactive the START input of counter 540 and thus stops and reset the counter 540.

Similarly, at the last byte of the four payloads being transferred,the counter 610 issues a END1 control signal for resetting the latch 590. This results in the stopping and resetting of counter 610 via OR gate 600.

On the contrary, should the microcontroller generates an START_Xmit_ECC control signal—indicating that an ECC is required for the transmission of the five payloads to the network—a state machine (described with respect to FIG. 6) is started, thus producing the EIMS control signal which is required by set-reset latch 500. Also, a START_CNT2_XMIT control signal is generated for setting the set-reset latch 570.

The setting of latch 570 causes the starting of the counting process in counter 610 (via OR gate 600), what results in the generation of the appropriate addresses on AD_Xmit_RAM_2_OUT address bus for RAM storage 310. Similarly, the setting of latch 500 causes the starting of the counting process in counter 540 (via OR gate 530), what results in the generation of the appropriate addresses on ADD_Xmit_RAM_1_OUT address bus for RAM storage 360. Also, the RD1 and WR1 control signal are respectively generated by OR gate 520 and OR gate 560.

Since the buffer 320 and 340 are respectively enabled and disabled, the above described operations results in the successive transfer of the bytes of the four payloads to the Reed Solomon Encoder 200 (particularly using the EIMS control signal), prior to their loading into the RAM storage 310.

When the last byte of the four payloads has been transmitted to the RSD module 200, counter module 540 produces an END2 control signal, what results in the resetting of latch 500, causing the stopping and resetting of counter 540. It should be noticed that in the preferred embodiment of the invention, counter 540 uses two different control signals END1 and END2. However, the same signal could be used since, in both cases with or without the use of an ECC, the completion of the counting process is required after the transmission of a sequence of four payloads.

However, although counter 540 waits for the transfer of four different payloads before the completion of its internal counting process, the second counter 610 has to wait for the transfer into RAM storage 310 of the data equivalent to four payloads plus an additional syndrome. This is achieved in the invention by means of a second control signal END2 which is issued when the RSD module 200 has generated the last byte of the syndrome. This causes the reset of latch 570, thus causing the stopping of the counting process via OR gate 600.

Figure 6:
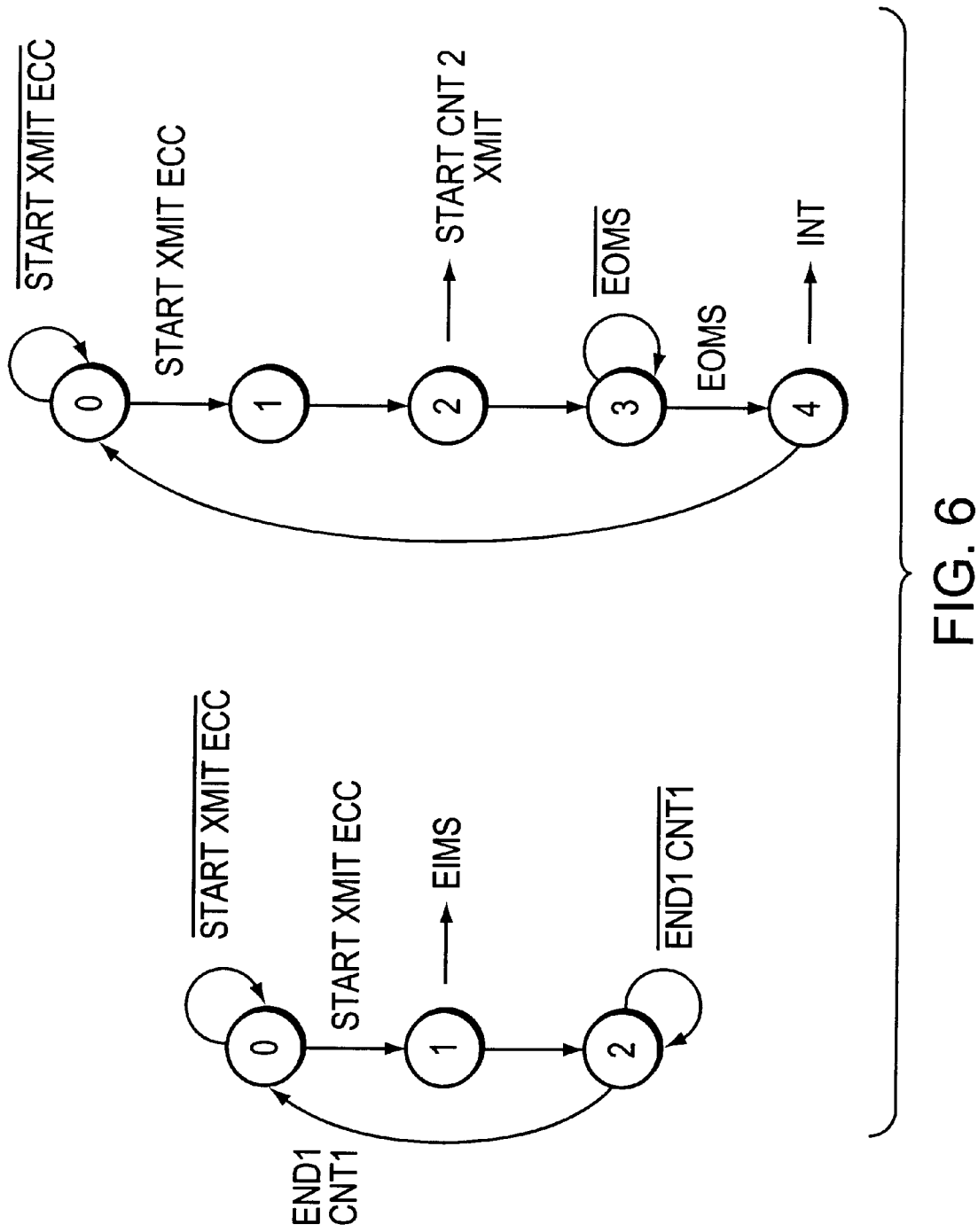
FIG. 6 illustrates the state machines that are involved in the transmit part of the present invention.

With respect to FIG. 6 there is now described the sequencing of the two state machines of the transmit part of the invention.

State machine 1 has a state 0 which corresponds to the waiting of the START_XMIT_ECC, in which case the machine proceeds to state 1. State 1 causes the generation of an EIMS signal which is required for the RSD module 200 as well as control module 300. The process then proceeds to state 2 where there is waited for the occurrence of the END1 control signal from counter 540, in which case the process proceeds to state 0 again.

The second state machine which is used for the transmit part has a first state 0 which corresponds to the waiting for the START_XMIT_ECC control signal from microcontroller 100. On the occurrence of the latter, the process proceeds to state 1 and then, after a clock period, to state 2. State 2 causes the issuance of the START_CNT2_Xmit control signal for counter 610, and the process proceeds with state 3 where it waits for the occurrence of the EOMS control signal produced by the RSD module 200. The process then proceeds to state 4 where there is produced the INT control signal which is transmitted to microcontroller 100 via OR gate 311. The process then goes to state 0 again.

Figure 7:
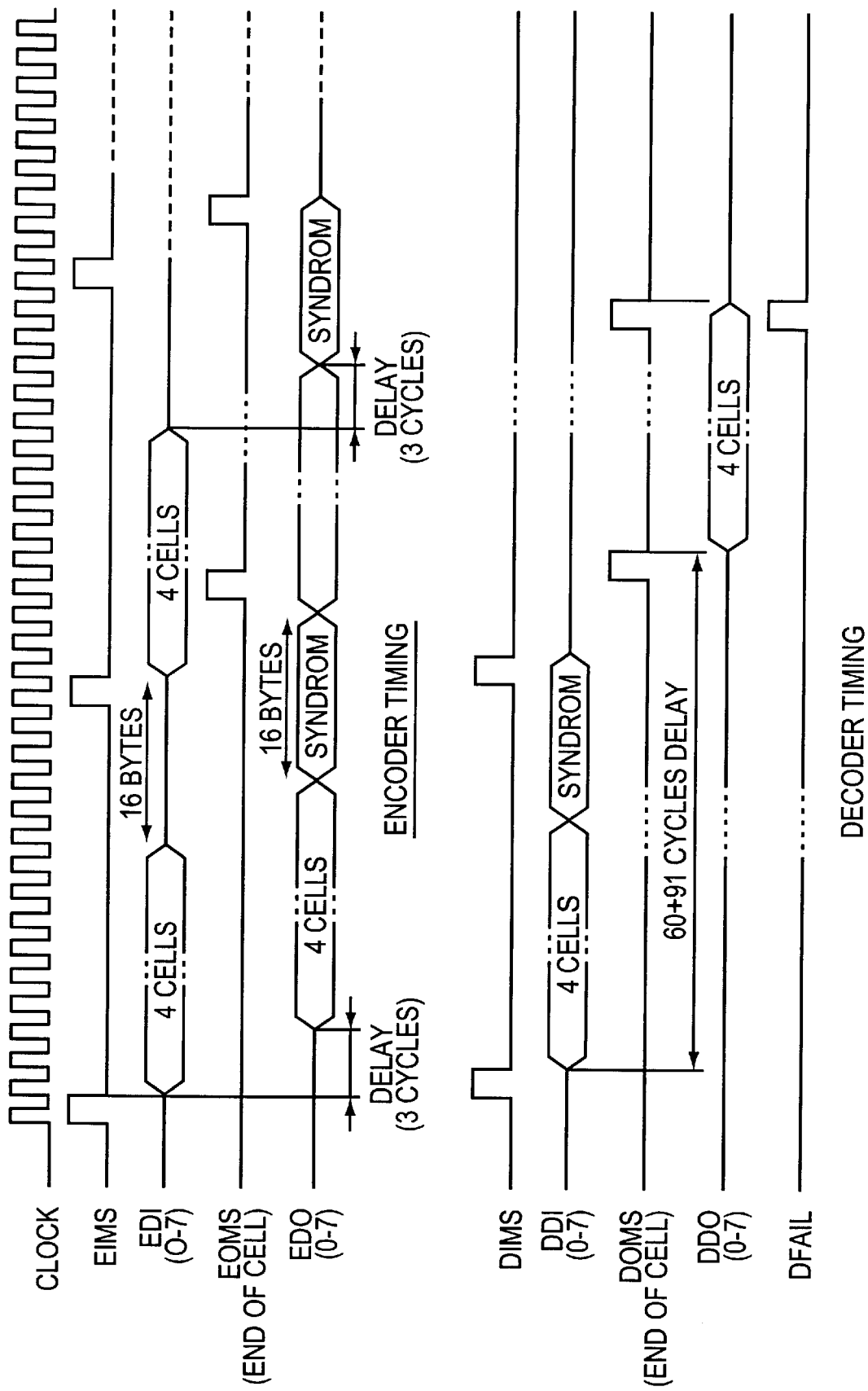
FIG. 7 are illustrative timing diagrams of the encoding and decoding process in accordance with the present invention.

With respect to FIG. 7 there is shown some illustrative timing diagrams of both the encoding and decoding operations that are involved by the RSD module 200.

Figure 8A:
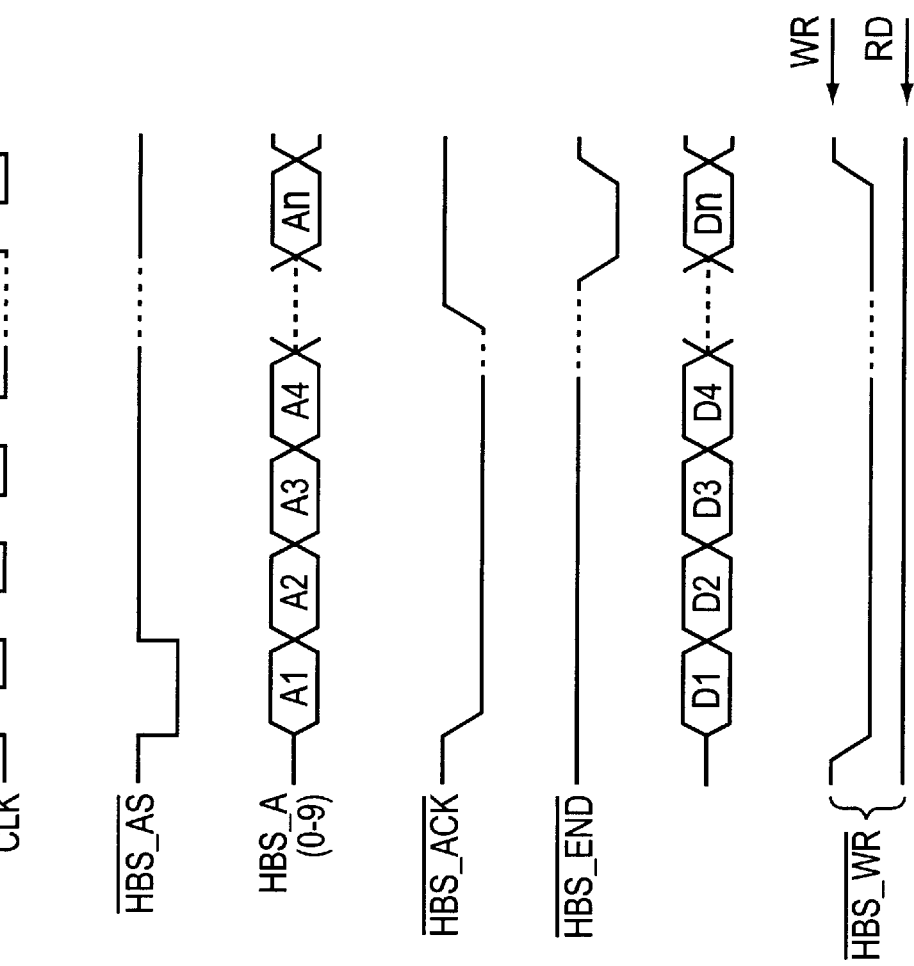
FIG. 8a shows the generation of the interface signals for the SAR circuit in accordance with the present invention.
Figure 8B:
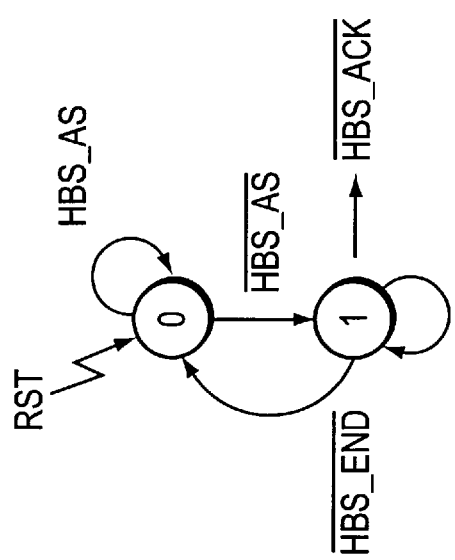
FIG. 8B shows the two different states of the state machine 800 illustrated in FIG. 3A.

With respect to FIG. 8A there is now shown the generation of the interface signals for the module 400 in accordance with the present invention. FIG. 8B shows the two different states of the state machine 800 illustrated in FIG. 3A. State 0 of the latter machine corresponds to the waiting of the HBS-AS signal (inverted), in which case the process proceeds to state 1 where there is generated the HBS-Ack control signal required by the SAR module so that it can initialize its DMA transfer. The process then waits for the occurrence of the HBS-END (inverted) control signal, in which case it goes back to state 0.

Figure 9:
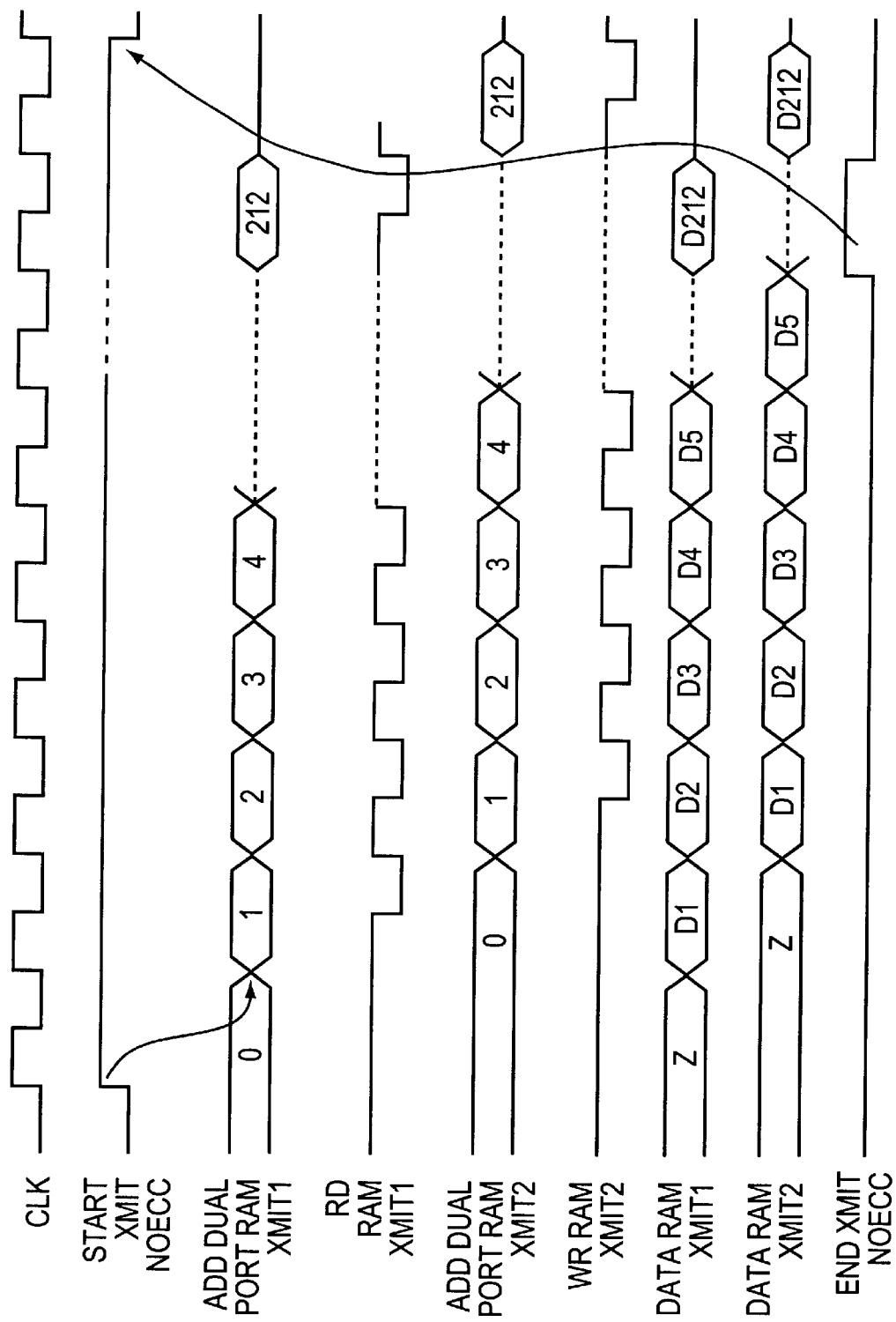
FIG. 9 are illustrative timing diagrams of the different signals which are involved in the transfer of data between the RAM storage when no error correcting procedure are required.

FIG. 9 are illustrative timing diagrams of the different signals which are involved in the transfer of data between the RAM storage when no error correcting procedure are required.

What is claimed is:

1. Telecommunication node for an Asynchronous Transfer Mode (A.T.M.) telecommunication network including:
    means (400) for performing Segmentation and Reassembly (SAR) of ATM cells, said SAR means particularly providing Virtual Channel Identifier (VCI) and Virtual Path Identifier (VPI) translation and comprising a Direct Memory Access (DMA) mechanism for a storage external to said SAR means, said SAR means performing a first DMA access when said VCI/VPI identifiers are representative of an Error Code Correcting (ECC) procedure to be carried out in said node, and said SAR means performing a second DMA access at a second address when said VCI/VPI correspond to an ATM message that does not require a local ECC procedure;
    a Reed-Solomon Coder and Decoder (200) for performing an ECC procedure on ATM cells,
    control means (100, 190, 300) for controlling said Reed-Solomon Coder and Decoder for performing an error correcting procedure in response to the detection of said first DMA access.

2. Telecommunication node according to claim 1 characterized in that it comprises a receive part further including:
    dual-port first RAM storage (170) having a first port designed to receive the data transferred via, either said first or said second DMA access from the internal circuitry of said SAR means (400), and having a second port for transferring data to said Reed-Solomon coder and decoder (200),
    second RAM storage (210) arranged in a FIFO organization for receiving the data processed by said Reed-Solomon coder and decoder (200) when the ATM message requires the need of an ECC procedure, or the data directly extracted from said dual-port first RAM storage by said control means (100, 190, 300) when no ECC procedure is required,
    address decoding means (150) for detecting whether said SAR means performs said first or said second DMA access, and issuing a corresponding interrupt to said control means (100, 190, 300) controls the performance of said ECC procedure in accordance with the detecting of said interrupt.

3. Telecommunication node according to claim 1 or 2 characterized in that it further comprises initialization means for performing a loading of said SAR means with the parameters characteristizing the number of ATM cells forming a full ATM message for which an error connecting procedure should apply.

4. Telecommunication node according to claim 1 characterized in that it comprises a transmit part further including:
    a first dual-port RAM storage (360) having a first port connected to a processor (100) and a second port,
    a second dual-port RAM storage (310) having a first port receiving the data coming either from said Reed-Solomon coder and decoder or said second port of said first storage, said second dual-port RAM storage having a second port that can be accessed by said DMA mechanism of said SAR means (400);
    control means (100, 190, 300) for causing said second dual-port storage to be loaded with the payloads of an ATM message, plus an additional payload containing the syndrome computed by said Reed-Solomon coder and decoder when an ECC mechanism is required,
    whereby the contents of all the payloads plus said syndromes is transferred to said SAR means for reassembly prior to their transmission to the ATM network.

5. Telecommunication node according to claim 4 characterized in that it further comprises initialization means for performing a loading of said SAR means with the parameters characterizing the number of ATM cells forming a full ATM message for which an error correcting procedure should apply.

6. Telecommunication node according to characterized in that said SAR means are initialized in order to process ATM message of four cells, plus an additional fifth cell for conveying the Reed-Solomon syndrome.

7. Telecommunication node according to claim 1 characterized in that said Reed-Solomon coder and decoder is substituted by a Hamming Coder and decoder.

8. A method for operation a telecommunication node for Asynchronous Transfer Mode (ATM), comprising performing Segmentation and Reassembly (SAR) of ATM cells, said SAR means particularly providing Virtual Channel Identifier (VCI) and Virtual Path Identifier (VPI) translation and comprising a Direct Memory Access (DMA) mechanism for a storage external to said SAR means, said SAR means performing a first DMA access when said VCI/VPI are representative of an Error Code Correcting (ECC) procedure to be carried out in said node, and said SAR means performing a second DMA access at a second address when said VCI/VPI correspond to an ATM message that does not require a local ECC procedure;

performing an ECC procedure on ATM cells by a Reed Solomon Coder and Decoder; controlling said Reed-Solomon Coder and Decoder for performing an error correcting procedure in response to the detection of said first DMA access.

* * * * *